June 6, 1961  J. O. ISRAEL  2,987,680
APPARATUS FOR GENERATING OSCILLATIONS OF DIFFERENT FREQUENCIES
Filed April 1, 1959  3 Sheets-Sheet 1

INVENTOR
J. O. ISRAEL
BY Patrick J. Roche
ATTORNEY

United States Patent Office 2,987,680
Patented June 6, 1961

2,987,680
APPARATUS FOR GENERATING OSCILLATIONS OF DIFFERENT FREQUENCIES
John O. Israel, West Orange, N.J., assignor to Bell Telephone Laboratories, Incorporated, New York, N.Y., a corporation of New York
Filed Apr. 1, 1959, Ser. No. 803,528
22 Claims. (Cl. 331—2)

This invention relates to apparatus for generating electric oscillations, and more particularly to such apparatus for simultaneously generating two discrete alternating current signals extending over a preselected frequency range and having a predetermined frequency difference therebetween.

In the testing of communications systems, it is necessary to have available sources of pure tones, i.e. sinusoidal signals, which may be transmitted therethrough. It is well established in the art that the performance of a transmission system handling complex signals may be satisfactorily evaluated by measuring the transmission characteristic thereof by such tones having different frequencies and lying in the operating frequency range of the system. One type of measuring system heretofore known used a pair of such tones provided with different frequencies and simultaneously made effective over the normally operating frequency-range of the transmission system under test.

Systems for simultaneously generating two or more tones of predetermined frequencies suitable for use in measuring transmission on signaling systems are known in the art. It has been heretofore noted that such systems may follow one of two general methods outlined in a paper by Messrs. Felch, Israel and Kummer published in the Convention Record of the I.R.E. (Instrumentation and Industrial Electronics) 1954 National Convention, Part 10, page 38, viz., a "synthesis" method or a "reference" method. According to the synthesis method, an example of which is disclosed in Patent No. 2,745,962, issued May 15, 1956, to B. M. Wojciechowski, a large number of tones of discrete frequencies suitable for measuring the transmission characteristics of a signaling system may be derived from apparatus including crystal oscillators, frequency dividers, multipliers, and heterodyne circuits. Using this method, it is not the generation of tones of desired frequencies which troubles a circuit designer; but rather it is the exclusion of tones of unwanted frequencies. This is particularly true when the desired frequencies of the two generated tones are closely spaced with such numerical values as may be required for measuring the transmission characteristic of a particular type of signaling system. Multiple modulation steps and the insertion of various interpolation frequencies subsequently cancelled in several heterodyning processes are necessary in order to separate unwanted modulation products from a wanted pair of closely spaced tones of predetermined frequencies. As a consequence, it has been found that the equipment required for the synthesis method tends to be complex.

On the other hand, the reference method represented by Patent No. 2,808,509, issued October 1, 1957, to E. P. Felch et al. employs apparatus comprising a plurality of locked oscillator units and associated mixers, reactance tubes, phase detectors and the like for effecting signaling tones of desired frequencies. Locked oscillators tend to follow a selected frequency and thereby exclude unwanted modulation products. With sufficient smoothing in its reactance tube controlling circuit, a locked oscillator unit may be made highly selective, without undue complexity. However, with increased frequency selectivity the reference method may encounter difficulty in following rapid changes in the numerical values of the reference frequencies such, for example, as might result from sharp changes in the numerical values of the reference frequencies occasioned by abrupt rotations of the range selection switches from a maximum value to a minimum value, or vice versa. As a consequence, it is possible in the reference method that an oscillator may lock its output frequency onto a spurious signal, or break free from synchronism with the frequencies supplied by other oscillators of the system.

The present invention contemplates facile apparatus including an oscillator calibrated over a preselected frequency range for simultaneously generating a pair of discrete signaling tones extending over a preselected frequency range related to preselected discrete frequencies of the calibrated oscillator and having a predetermined frequency difference therebetween, while at the same time substantially maintaining frequency synchronism in the apparatus regardless of abrupt changes in the numerical values of the calibrated and other frequencies from which the pair of signaling tones are derived.

It is a principal object of the present invention to improve the tracking reliability of a plurality of variable frequency oscillators for providing two signaling tones of different frequencies which are related to a common frequency and may be subject to rapid changes of numerical values.

It is another object to provide apparatus for simultaneously generating two signaling tones related in the numerical values of their frequencies over a preselected frequency range to a common frequency, while permitting complete freedom in the abrupt selection of the respective frequencies.

It is a further object to maintain synchronism in apparatus utilizing a group of oscillators of variable frequencies for producing a plurality of signaling tones of different variable frequencies which are related to a common frequency, with unlimited freedom in regard to the abrupt selection of such tones without impairing the frequency synchronism of the apparatus.

It is another object to utilize frequency and phase discrimination for maintaining lock-in of the frequency difference between two signaling tones of different frequencies which are simultaneously generated in relation to a common frequency in apparatus whose frequency synchronism is substantially maintained at all times, regardless of abrupt selections of the respective signaling frequencies.

It is also another object to minimize the effect of transients in a plurality of automatic frequency control circuits due to abrupt changes in the numerical values of two signaling tones which are related to a common frequency and simultaneously generated by feeding forward a portion of the error voltage at one control circuit into the next succeeding control circuit.

It is also a further object to improve the speed of response of a plurality of automatic frequency control circuits in the event of abrupt selections of discrete frequencies from which two signaling tones are simultaneously generated in relation to a common frequency by utilizing the error voltage of one control circuit to supplement the error voltage of the next succeeding control circuit.

The invention will be readily understood from the following description when taken together with the accompanying drawing in which.

In a system for producing two signaling tones extending over a preselected frequency range and having a predetermined frequency difference therebetween, a specific embodiment of the invention comprises a calibrated oscillator, a plurality of sources of reference frequencies, a group of variable frequency oscillators, a plurality of automatic frequency control loops for connecting the calibrated oscillator, the reference frequency sources, and the group of oscillators in circuit, means for deriving one of the signaling tones from the outputs of the calibrated oscillator, selected reference frequency sources, and certain oscillators of the group of oscillators controlled by two of the loops, and means for deriving the other signaling tone at the same time from the outputs of the calibrated oscillator, other selected reference frequency sources including the first-mentioned selected sources, and the entire group of oscillators controlled by all of the loops. Frequency and phase detectors are included in the first and second signaling deriving means for obtaining coarse and fine adjustments of the frequencies effective in the automatic frequency control loops connected to the respective deriving means.

In a modification, the invention also includes an impedance network for coupling one automatic frequency control loop to a next succeeding automatic frequency control loop and thereby feeding forward a portion of an error signal developed in the one loop into the next succeeding loop to control the oscillators connected in both the one and succeeding loops by the same error voltage for substantially maintaining frequency lock-in of the oscillators in the respective loops with a preselected sideband, regardless of abrupt changes in the numerical values of the two signaling tones of different frequencies.

One feature of the invention is the utilization in circuit of a calibrated oscillator, a group of variable frequency oscillators, and a plurality of interconnected automatic frequency control loops for producing a pair of tones having frequencies related to that of the calibrated oscillator and locked-in at a predetermined frequency difference therebetween.

Another feature concerns the feeding forward of a portion of the error voltage produced in one automatic frequency control loop into a succeeding automatic frequency control loop for simultaneously controlling the signaling frequencies produced in both loops in response to such one error signal.

A further feature resides in the use of predetermined amounts of one error signal in two successive automatic frequency loops whereby the frequency control effected in the respective loops is achieved in corresponding extents in the two loops.

Another feature involves the use of a portion of the error signal produced in one automatic frequency control loop in a succeeding automatic frequency control loop without impairing the net gain of the one loop.

Also another feature relates to the maintenance of lock-in between the output frequencies of several oscillators at a predetermined sideband difference therebetween, without impairing the synchronism of the respective oscillators.

Still another feature is directed to the apportionment of one error voltage between two adjacent automatic frequency control loops in order to minimize the effect of a shock transient occurring in one of the loops.

A still further feature resides in the use of an automatic frequency control loop which is controlled by a reference voltage of preselected frequency connected in circuit therewith as well as by an error voltage supplied thereto from a preceding automatic frequency control loop which includes another reference oscillator of a differently preselected frequency.

Still another feature concerns the use of frequency-sensitive networks in the reference and difference frequency branches of the frequency and phase detectors.

Figure 1:
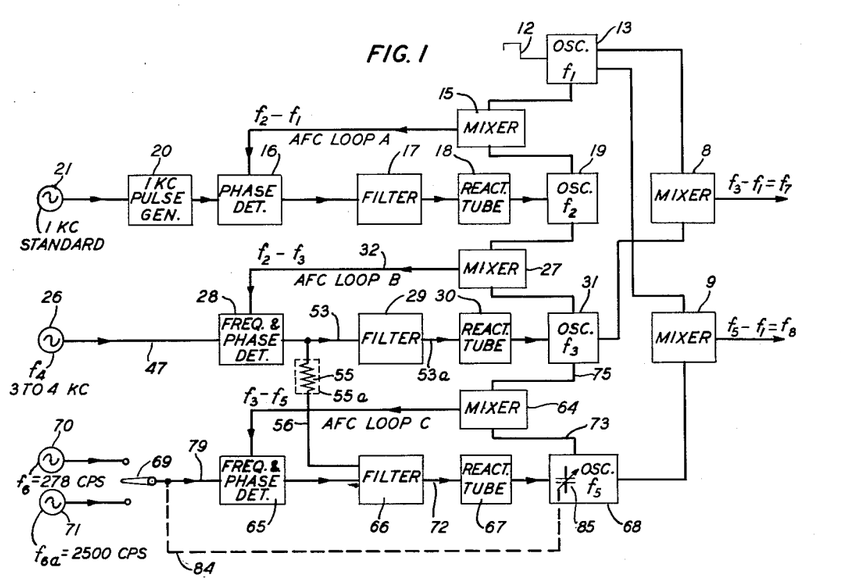
FIG. 1 is a block diagram of a specific embodiment of the invention.

FIG. 1 represents a system for producing a pair of output signaling tones having preselected frequencies $f_7$ and $f_8$ which are caused to differ in frequency by precisely the frequency $f_6$ or $f_{6a}$ of either reference oscillators 70 or 71 and which are made available at the output of mixers 8 and 9, respectively, in a manner that will be presently explained. Tone $f_7$ may be set at a desired frequency in a 10-kc. through 300-kc. frequency range by appropriate adjustment of a tuning dial 12 included in calibrated oscillator 13 which comprises a well-known self-excited inductance-capacitance type. Tone $f_7$, as the difference between the controlled output frequencies $f_3$ and $f_1$ of oscillators 13 and 31, respectively, tracks automatically and accurately changes in the particular selections of frequencies $f_1$ and $f_4$ in a sense that will now be explained.

A first automatic frequency control loop A contains a mixer 15, a phase detector 16, a filter 17, a reactance tube 18, and an oscillator 19 of variable frequency $f_2$. Oscillator 13 is designed to have good short-time frequency stability and may be set to any frequency in the 10-kc. through 300-kc. range by adjustments of its tuning dial 12. For example, for an output frequency $f_7$ lying in the 10-kc. through 300-kc. range, oscillator 13 may conveniently have a frequency $f_1$ lying in a 1390-kc. through 1100-kc. range and its tuning dial 12 marked 10-kc. to 300-kc. corresponding to the frequencies 1390-kc. through 1100-kc., respectively. Oscillator 19 is selected to have a frequency $f_2$, 1404-kc., for example, falling outside and above the range of frequency $f_1$, by an amount which is consistent with the practical tuning range of the reference oscillators discussed below. The frequency of oscillator 19 is controllable over a small pull-in range above and below its nominal operating frequency by reactance tube 18 in the well-known manner disclosed, for example in Patent No. 2,610,297, issued September 9, 1952, to D. Leed. A first portion of the output frequency $f_2$ of oscillator 19 and a first portion of the output frequency $f_1$ of oscillator 13 are supplied to the input of mixer 15 whose output will then include a component having the difference frequency $f_2-f_1$ therebetween. This component is supplied to the input of a phase detector 16 of a type disclosed, for example, in Patent No. 2,808,509, issued October 1, 1957, to E. P. Felch et al. For the purpose of simplifying the following explanation, it will be understood that mixer 15 and similar mixers mentioned hereinafter include filtering means, not shown, for passing the lower sideband modulation products and attenuating the unwanted modulation products.

Also applied to the input of detector 16 is a series of short pulses of an accurately predeterminedly repetition rate. Preferably, these pulses may be of a quarter microsecond duration and have a 1-kc. repetition rate supplied by a pulse generator 20 which is actuated by a source 21 of 1-kc. standard frequency in the usual manner. Detector 16 is arranged to deliver through filter 17 to reactance tube 18 an error signal which varies steeply in magnitude in proportion to the phase difference between the difference frequency $f_2-f_1$ and one of the 1-kc. harmonics as disclosed in Felch et al., supra, and further identified below. Thus it will be understood that reactance tube 18 varies the frequency of oscillator 19 in the well-known manner as exemplified in either the Leed or Felch et al. patent, supra.

In operation, loop A establishes the identity:

$$f_2-f_1=N\times 1\text{-kc.} \tag{1}$$

where N is an integer determined by the frequency $f_1$ set by the position of tuning dial 12 on oscillator 13 and greater by an integer 4 than the setting in kilocycles of the latter dial as will be further explained below. The reactance tube 18 thus serves to maintain the identity indicated in Equation 1 regardless of a tendency toward frequency drifts in oscillator 13. Thus, the difference frequency $f_2-f_1$ represented by Equation 1 will always be equal to some harmonic of the 1-kc. reference voltage supplied by oscillator 21, the exact harmonic being determined by the particular output frequency $f_1$ selected by oscillator 13 at any given time, as disclosed in the Felch et al. patent, supra. As a consequence, the basic requirements of loop A are to provide: (1) a lock-in or holding range not to exceed ±500 cycles per second at any harmonic of 1-kc. thereby precluding loop A from holding one value of difference frequency $f_2-f_1$ while the calibrated oscillator 13 is being set to another and different output frequency $f_1$, and (2) a pull-in range as large as possible within such lock-in range in order to facilitate the setting of calibrated frequency $f_1$ at desired numerical values.

In view of the foregoing, it is obvious that the action of loop A during the foregoing variations effected in the frequency $f_1$ is to vary the output frequency $f_2$ as much as ±500 cycles per second at a rate determined by the speed at which the frequency $f_1$ is varied. When the frequency $f_1$ is set at a value at which locking can occur, the frequency $f_2$ will then assume such value that the difference frequency $f_2-f_1$ will be exactly equal at all times to the nearest harmonic of the 1-kc. voltage derived from reference oscillator 21.

Correlation between the precise harmonic values of the 1-kc. reference oscillator 21 determined by loop A and specifically preselected frequencies provided by interpolation of reference oscillator 26 is achieved by the action in loop A in conjunction with automatic frequency control loop B. This loop includes a mixer 27, a frequency and phase detector 28 having a characteristic described hereinafter, a filter 29, a reactance tube 30 identical with reactance tube 18, and an oscillator 31 of variable frequency $f_3$. The output frequency $f_4$ of reference oscillator 26 is selected to provide an accurate tuning scale and good frequency stability over a range, for example, of 1-kc. extending between 3 and 4-kc. This accounts for the difference by integer 4 between the integer N in Equation 1 and a given setting of dial 12 on calibrated oscillator 13. Based on the desired range for output frequency $f_7$ and the related range for frequency $f_1$, the nominal frequency of oscillator 31 is variable 1-kc. in a 1400-kc. through 1401-kc. range. A second portion of the output frequency $f_2$ of oscillator 19 and a first portion of the output frequency $f_3$ of oscillator 31 are supplied to the input of mixer 27 whose output will then include a component having the difference frequency $f_2-f_3$ which is applied to the input of detector 28. To the input of this detector is also supplied the reference voltage of frequency $f_4$ from oscillator 26. The error signal from the output of detector 28 is then applied through filter 29 to reactance-tube 30 which activates oscillator 31 to vary the output frequency $f_3$ thereof, as required, in the well-known manner as exemplified in the Leed patent, supra.

As detector 28 provides both frequency and phase discrimination between two alternating current voltages in a manner to be explained hereinafter in connection with FIGS. 2 and 3, the error signal in the detector output includes: (1) a component proportional to the magnitude and direction of frequency changes in each of the difference and reference voltage $f_2-f_3$ and $f_4$, respectively, and (2) a component proportional to the phase difference between the difference frequency $f_2-f_3$ and the reference frequency $f_4$, as further hereinafter explained. Thus, the action of loop B tends automatically to maintain the difference frequency $f_2-f_3$ exactly equal to that of the reference frequency $f_4$.

Loop B controls the output frequency $f_3$ of oscillator 31 so that when either one or both of the frequencies $f_2$ and/or $f_4$ changes, loop B will cause a corresponding change in the frequency $f_3$ to render frequency $f_2-f_3$ equal to reference frequency $f_4$. As previously mentioned in regard to loop A, the frequency $f_2$ may change as much as 500 cycles per second in either direction when the calibrated frequency $f_1$ is being varied. Such frequency changes in loop A are readily followed in loop B without impairment of the synchronism of the frequencies $f_2-f_3$, $f_3$, and $f_4$ effective in the latter loop.

It will be noted, however, that reference frequency $f_4$ may be set, for example, at preselected discrete frequencies in the range from 3-kc. to 4-kc. as aforenoted. For this purpose, it will be understood that reference oscillator 26 comprises an accurate decade type including ten steps (0 through 9) of each of 100, 10 and 1 cycles per second, not shown. The rotation of either of such three decade tuning dials is not restricted as to amount or direction at a given time, and may be moved slowly or abruptly through any of its steps, including the step from 9 to 0, or vice versa. When either decade tuning dial is moved slowly to change the reference frequency $f_4$ slowly, then the controlled frequency $f_3$ will follow smoothly due to the fact that the error signal produced by detector 28 will include the component proportional to the slowly changing phase relation between the frequencies $f_2-f_3$ and $f_4$, as well as the component due to the frequency changes of the difference frequency $f_2-f_3$ and of the reference frequency $f_4$ as will be explained in more detail later on. When one of the decade tuning dials is moved abruptly, however, such phase component would tend to be omitted from loop B. As a consequence, the controlled frequency $f_3$ would tend to be thrown out of synchronism with the aforementioned other frequencies effective in the latter loop. The technique for maintaining synchronism in loop B in the presence of such transient resides in the fact that frequency and phase detector 28 will produce a component proportional to the resulting abrupt changes of the reference frequency $f_4$ in corresponding magnitude and direction This component will serve to activate reactance tube 30 thereby controlling the frequency of oscillator 31 in proper magnitude and sense for effecting the required changes in frequency $f_3$ to tend to maintain such synchronism, in a manner that will be presently explained in detail. A second portion of the controlled frequency $f_3$ is supplied to mixer 8 for intermodulation with a second portion of the calibrated frequency $f_1$ to produce the first output tone $f_7$.

As previously stated, the operation of loop B maintains the identity:

$$f_2-f_3=f_4 \tag{2}$$

Now, combining Equations 1 and 2, it follows:

$$f_3-f_1=N\times 1\text{-kc.}-f_4=f_7 \tag{3}$$

Thus, the combined operations of loops A and B serve to establish the first output tone $f_7$ shown in FIG. 1 and having any preselected frequency lying in the spectrum extending from 10-kc. through 300-kc., with a frequency stability in cycles per second equal to the frequency stabilities of the 1-kc. standard oscillator 21 and the reference oscillator 26; and with substantial maintenance of synchronism among the frequencies effective in loops A and B irrespective of slow or abrupt movements of the manually tuning dials associated with oscillators 13 asd 26.

Figure 2A:
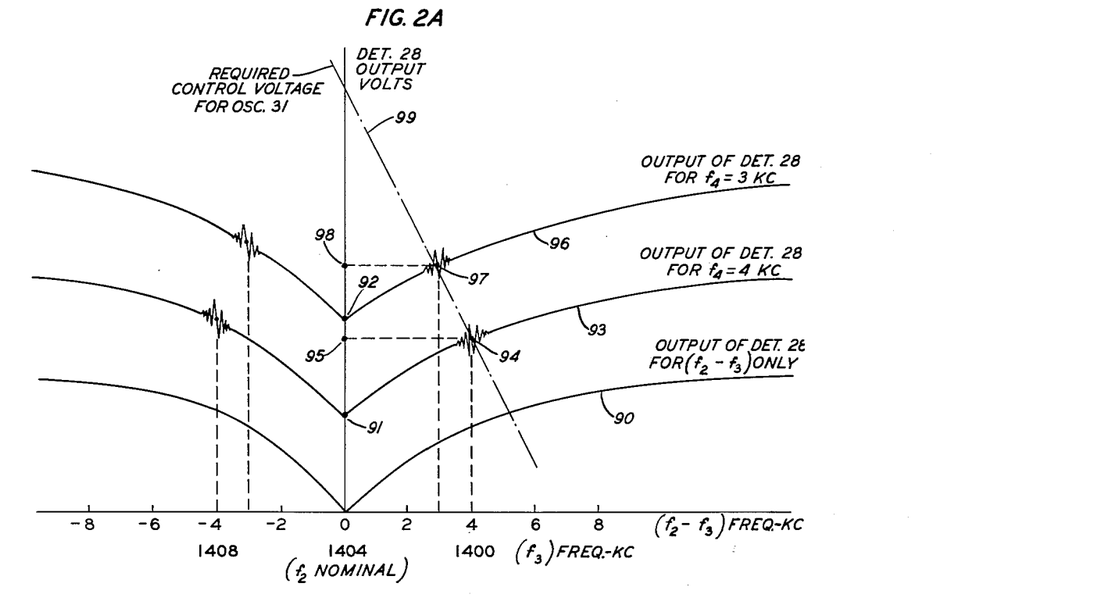
FIGS. 2A and 2B comprise a family of curves showing voltage-frequency characteristics of action obtainable in FIGS. 1 and 3.
Figure 2B:
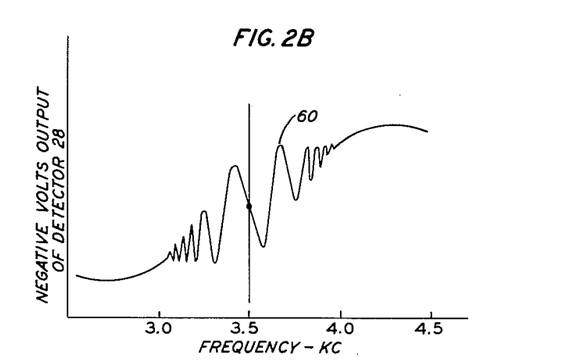
Figure 3:
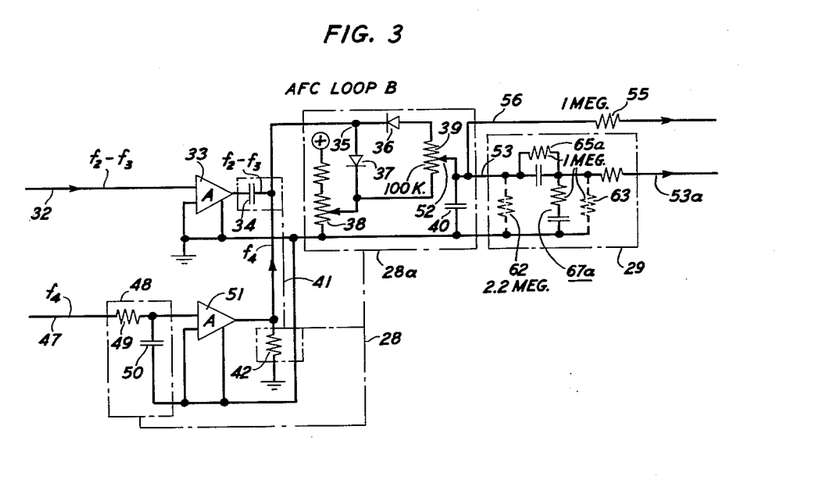
FIGS. 3 and 4 are circuit diagrams of frequency and phase detectors used in FIG. 1.

Referring now to FIG. 3, there is illustrated a circuit suitable for the frequency and phase detector 28 shown in FIG. 1 and having the characteristic delineated in FIG. 2. A voltage of the difference frequency $f_2-f_3$ taken from the output of mixer 27 is applied over lead 32 to the input of buffer amplifier 33 whose $f_2-f_3$ output is supplied through capacitor 34 (0.01 microfarad) to a common input point 35 of diodes 36 and 37. These diodes are connected in circuit with variable resistors 38 and 39 and capacitor 40. Also, a connection extends from the output side of capacitor 34 through resistor 42 (10,000 ohms) to ground. As the frequency decreases below 4 kilocycles, the impedance of capacitor 34 increases correspondingly compared with that of resistor 42, the latter capacitor and resistor constitute a frequency-sensitive network 41 for the difference frequency $f_2-f_3$. This frequency in the unlocked condition of the respective oscillators may vary from zero to more than 4 kilocycles. It will be understood that the network may also be connected in the input of buffer amplifier 33. The reference voltage $f_4$ is delivered from oscillator 26 via lead 47 and frequency-sensitive network 48 comprising series resistor 49 and shunt capacitor 50 to the input of buffer amplifier 51. This amplifier has its output connected to the common input terminal 35 of detector 28. Thus, frequency-selective networks 41 and 48 together with common point 35, diodes 36 and 37, variable resistors 38 and 39, and capacitor 40 constitute effectively the overall detector 28.

Figure 4:
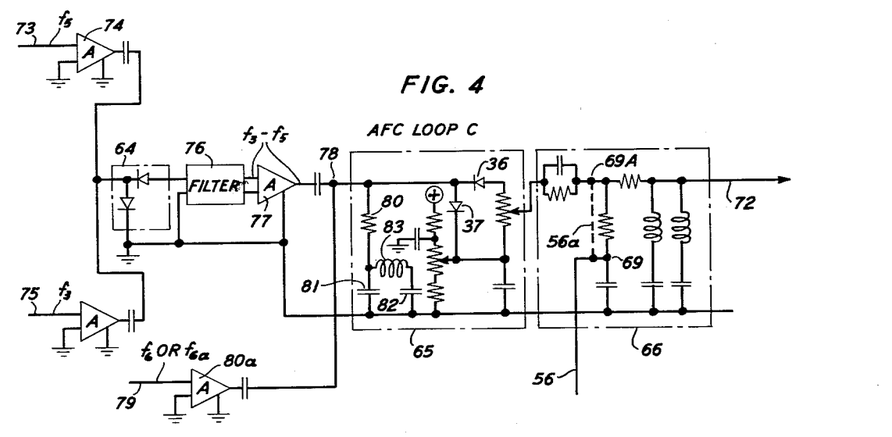

In the operation of the circuit shown in FIG. 3, it will be understood that the voltage $f_4$ at common point 35 in the output of buffer amplifier 51 in view of the functioning of frequency-sensitive network 48 increases in magnitude in response to decreases in the frequency of reference voltage $f_4$ and decreases in response to increases in the frequency thereof. It will be further understood that, at the same time, the difference-frequency voltage $f_2-f_3$ at the common point 35 in the output of buffer amplifier 33 in view of the functioning of frequency-sensitive network 41 increases in magnitude in response to increases in the frequency of the difference-frequency voltage $f_2-f_3$ and decreases in response to decreases in the frequency thereof. Thus, the frequency-sensitive networks 41 and 48 have oppositely sloping frequency characteristics whereby oppositely varying magnitudes of output voltages are derived therefrom. The composite wave comprising voltages $f_2-f_3$ and $f_4$ effective at common point 35 is rectified in diode detector 28a which produces an error output voltage component whose magnitude tends to increase in response to increases in the frequency of the difference voltage $f_2-f_3$ but decreases in response to increases in the frequency of the reference voltage $f_4$, and vice versa; and a further error output voltage component whose magnitude tends to vary in response to increases in the phase difference between the difference voltage $f_2-f_3$ and reference voltage $f_4$, and vice versa. A first portion of this error voltage comprising two such components is applied from slider 52 on resistor 39 via lead 53, filter 29 and lead 53a to reactance tube 30 for controlling the frequency $f_3$ of oscillator 31. A second portion of the error voltage in the output of detector 28 is applied via resistor 55 and lead 56 to loop C as shown in FIGS. 1, 3 and 4 in a manner and for a purpose that will be hereinafter explained.

Referring now to FIG. 2 for a further explanation of the operation of the overall detector 28 in FIGS. 1 and 3, it will be understood from the foregoing description that the difference and reference voltages $f_2-f_3$ and $f_4$, respectively, are applied to common input terminal 35. When the frequency of one of the two afore-identified voltages has a numerical value far different from that of the other, then the detected voltage resulting from such far different frequency voltage predominates in the detector output. On the other hand, when the frequencies of those two voltages approach identically numerical values, beats therebetween produce alternating voltage variations in the detector output. However, when the frequencies of the two voltages have identical numerical values but the two voltages differ only in mutual phase, then the two voltages either subtract or add depending on their mutual phase relation. Thus, the output of detector 28 will include one component related to the frequency variations in each of the difference and reference voltages $f_2-f_3$ and $f_4$, and another component related to the phase difference between these two voltages.

Since the reference frequency $f_4$ may be set at discrete, constant, frequencies in the 3 to 4-kc. range, its influence reflected into the output of detector 28 comprises a voltage component having a fixed value related to the particular frequency $f_4$ at a given time, as determined by the frequency-sensitive network 48. The difference frequency $f_2-f_3$ may assume various numerical values when loop B is not locked-in, and its influence reflected into the output of detector 28 involves a voltage component which is essentially proportional to such frequencies. As the numerical value of difference frequency $f_2-f_3$ approaches equality with that of reference frequency $f_4$, detector 28 functions as a phase discriminator and thereupon produces in its output a voltage component which is proportional to the time integral of the frequency difference between the frequencies $f_2-f_3$ and $f_4$. Thus, in the detector output, the frequency voltage component tends to minimize the frequency difference between the $f_2-f_3$ and $f_4$ frequencies whereas the phase voltage component tends to effect equalization between the numerical values of these frequencies, in accordance with Equation 2. This is further explained in the Leed patent, supra.

For the purpose of this explanation, FIGS. 2A and 2B represent the frequency and phase characteristic of the output of detector 28. Symmetrical curve 90 shows the detector output for frequency variations in the difference voltage $f_2-f_3$ alone, in response to the action of frequency-selective network 41. Obviously, in such case, the detector output voltage is zero when the frequency difference $f_2-f_3$ is also zero, i.e., when no difference occurs between the frequencies $f_2$ and $f_3$. As such frequency difference increases, then the output voltage increases with a positive slope when the numerical frequency $f_3$ is smaller than that of frequency $f_2$ whereas the output voltage increases with a negative slope when the numerical value of frequency $f_3$ is greater than that of frequency $f_2$. These slopes are illustrated in FIG. 2A, and ensure frequency lock-in at the proper sideband in a manner that will be later mentioned.

When the reference voltage $f_4$, having a maximum frequency of 4 kilocycles, is added to the difference voltage $f_2-f_3$ when the latter voltage is zero, then the detector output voltage has a magnitude shown at point 91 on the voltage ordinate in FIG. 2A. On the other hand, when the reference voltage $f_4$ having a minimum frequency of 3 kilocycles is added to the difference voltage $f_2-f_3$, when the latter voltage is also zero, then the detector output voltage has a magnitude shown at point 92 on the ordinate in FIG. 2A. This is achieved with the aid of the frequency-selective network 48 as above mentioned, and assumes the frequency $f_2$ supplied from loop A into loop B has a nominal numerical value of 1404 kilocycles.

Referring further to FIG. 2A, let it be assumed initially that the frequency $f_2$ from loop A is held at a fixed 1404-kc. frequency, the reference frequency $f_4$ is fixed at 4 kilocycles, and the difference frequency $f_2-f_3$ is held at 4 kilocycles This serves to satisfy Equation 2. Now, reactance tube 30 which controls the frequency $f_3$ of oscillator 31 is activated by a detector output voltage comprising a component proportional to the frequency difference between the reference frequency $f_4$ and the difference frequency $f_2$ and $f_3$, and a component proportional to the phase difference between the reference and difference voltage $f_4$ and $f_2-f_3$, respectively, as hereinbefore mentioned. As the difference frequency $f_2-f_3$ of 4 kilocycles is initially assumed to equal the reference frequency $f_4$ of 4 kilocycles, then the frequency difference component therebetween is zero, and the phase difference component has a magnitude due to some phase difference lying between 0° and 360°. This may be represented on curve 93 by point 94 which, projected onto the ordinate at point 95, indicates the output voltage of the detector for the assumed condition. In accordance with this assumption and for the purposes of this illustration, the following frequency values in kilocycles obtain in FIG. 1: $f_2=1404$; $f_3=1400$; $f_2-f_3=4$; and $f_4=4$.

Now let it be further assumed that the frequency $f_2$ received from loop A is still held at 1404 kilocycles, reference frequency $f_4$ is fixed at 3 kilocycles, and the difference frequency $f_2-f_3$ is held at 3 kilocycles. Again, this serves to satisfy Equation 2. Now, reactance tube 30 is activated by a detector output voltage comprising a component proportional to the frequency difference between the reference frequency $f_4$ and difference frequency $f_2-f_3$, and a component proportional to the phase difference between the reference and difference frequencies $f_4$ and $f_2-f_3$, respectively. As the difference frequency $f_2-f_3$ of 3 kilocycles is initially assumed to be equal to the reference frequency $f_4$ of 3 kilocycles, then the frequency difference component therebetween is zero, and the phase difference component has a magnitude due to some phase difference lying between 0° and 360° but different from that mentioned above regarding the assumption of a reference frequency of 4 kilocycles. This may be represented on curve 96 by point 97 which, projected onto the ordinate at point 98, indicates the detector output voltage required to activate reactance tube 30 and thereby vary the frequency $f_3$ of oscillator 31 to satisfy the latter assumed condition. In accordance with this assumption and for the purpose of this illustration, the following frequency values in kilocycles obtain in FIG. 1: $f_2=1404$; $f_3=1401$; $f_2-f_3=3$; and $f_4=3$.

As a consequence, line 99 may be drawn through points 94 and 97 lying on curves 93 and 96, respectively, thereby indicating the slope of the detector output voltage required for frequency variations of reference frequency $f_4$ between 4 and 3 kilocycles. Obviously, then, as the reference voltage $f_4$ is varied in discrete frequency steps between 4 and 3 kilocycles, the output voltage of detector 28 required to activate reactance tube 30 for varying the output frequency $f_3$ of oscillator 31 falls on line 99 between the points 95 and 98 shown on the voltage ordinate in FIG. 2A.

Now, let it be assumed that loop B is locked with reference frequency $f_4$ set at 4 kilocycles. This fixes the difference frequency $f_2-f_3$ also at 4 kilocycles in order to satisfy Equation 2. If the reference frequency $f_4$ were now abruptly changed from 4 to 3 kilocycles, then the detector output voltage indicated at point 98 in FIG. 2 would be required to activate reactance tube 30 and thereby vary the output frequency $f_3$ of oscillator 31 to a corresponding amount in order to satisfy Equation 2 with the newly assigned 3-kc. reference frequency $f_4$. As hereinbefore mentioned, detector 28 will readily follow a slow change in the reference frequency $f_4$ from 4 to 3 kilocycles, for example, and maintain frequency synchronization in loop B.

For the afore-noted abrupt change from 4 to 3 kilocycles in the reference frequency $f_4$, loop B will still hold frequency synchronism by the prompt response of frequency-selective network 48 in FIG. 3 whereby the detector output voltage is now made a function of the reference frequency $f_4$. As a consequence, the detector provides an output voltage which is sufficient to activate reactance tube 30 for varying the output frequency $f_3$ of oscillator 31 to an amount whereby the difference frequency $f_2-f_3$ is made substantially equal to the 3-kc. reference frequency $f_4$. As the difference frequency $f_2-f_3$ approaches equality with the reference frequency $f_4$, the beats between those frequencies will produce alternating current voltage variations in the detector output. FIG. 2B represents the beat frequency 60 which results when the output detector 28 is passed through filter 29. Thus, the phase discrimination of detector 28 predominates to pull the controlled frequency $f_3$ into synchronism with the other frequencies in loop B whereby difference frequency $f_2-f_3$ is made equal to reference frequency $f_4$ to satisfy Equation 2.

In the event loop B is not locked-in at the required frequencies for the initially assumed 4-kc. reference frequency $f_4$ afore-mentioned and controlled frequency $f_3$ tends to have a numerical value in excess of that value, say 1408 kilocycles, required to maintain such lock-in, there would result a difference frequency $f_2-f_3$ of $-4$ kilocycles, i.e., the frequency $f_3$ would be larger than frequency $f_2$. This would possibly tend to cause such phase discrimination as would tend to produce the correct detector output voltage whereby the controlled frequency $f_3$ would be held at the 1408-kc. value. Since the slope of the frequency-sensitive network 41 for the frequency difference $f_3-f_2$ including the controlled 1408-kc. frequency $f_3$ is in a direction opposite to that for the 1400-kc. controlled frequency $f_3$ shown in FIG. 2 as above-mentioned, loop B would remain unstable and continue to change the detector output voltage until the controlled frequency $f_3$ attains the 1400 kilocycles for the assumed 4-kc. reference frequency $f_4$ to satisfy Equation 2.

Similarly, when variations occur in the frequency $f_2$ supplied from loop A to loop B or in the reference frequency $f_4$ between 3 and 4 kilocycles, the line 99 drawn through points 94 and 97 would indicate projections on the voltage ordinate in FIG. 2 the corresponding values of detector output voltages required to satisfy Equation 2.

In order to provide the second output tone $f_8$ shown in FIG. 1, a third automatic frequency control loop C is added. This loop includes mixer 64, detector 65, filter 66, reactance tube 67 and oscillator 68 providing a variable frequency $f_5$. This oscillator is connected to mixer 64 which, as previously noted, is also connected to oscillator 31. In addition, detector 65 is also connectable via manual switch 69 to either reference oscillator 70 providing a 278-c.p.s. fixed frequency $f_6$ or reference oscillator 71 providing a 2500-c.p.s. fixed frequency $f_{6a}$. Thus, a further portion of the output frequency $f_3$ of oscillator 31 and one portion of the output frequency $f_5$ of oscillator 68 are supplied to the input of mixer 64 whose output then is caused to include a difference frequency $f_3-f_5$. The latter frequency is supplied to the input of detector 65 together with either reference frequency $f_6$ or $f_{6a}$ depending on the offset frequency desired between the output tones $f_7$ and $f_8$. Detector 65 functions as a frequency and phase detector substantially in regard to difference frequency $f_3-f_5$ and either of the reference frequencies $f_6$ and $f_{6a}$ in the manner above-explained for detector 28 and as further discussed below.

Thus, the error signal occurring in the output of detector 65 and selected by filter 66 activates reactance tube 67 to vary the output frequency $f_5$ of oscillator 68 for maintaining the difference frequency $f_3-f_5$ equal to either one of the reference frequencies $f_6$ and $f_{6a}$, as desired. As a consequence, any change in either of controlled frequency $f_3$ or reference frequency $f_6$ or $f_{6a}$ is compensated by an equal change in controlled frequency $f_5$. Since either reference frequency $f_6$ or $f_{6a}$ may be abruptly selected, such selection would tend to introduce a severe transient into loop C, in the manner of the similar transient afore-described in connection with loop B, thereby tending to impair the frequency synchronism of controlled frequency $f_5$ with the other frequencies effective in loop C. In attendance therewith, there is also the possibility that loop C will tend to lock-in at the undesired sideband of $(+)$ frequency $f_6$ or $f_{6a}$ instead of at the desired sideband of $(-)$ frequency $f_6$ or $f_{6a}$, i.e., the difference frequency may turn out to be the unwanted difference frequency $f_3+f_6$ or $f_{6a}$ instead of the wanted difference frequency of $f_3-f_6$ or $-f_{6a}$.

Figure 5:
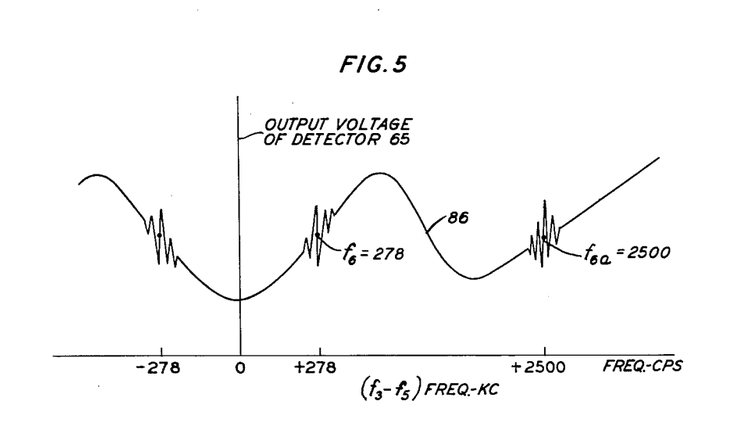
FIG. 5 illustrates the frequency-voltage characteristic of action obtainable in FIGS. 1 and 4.

As detector 65 provides both frequency and phase discrimination in a manner to be hereinafter explained in connection with FIGS. 4 and 5, the error signal in the detector output should include: (1) a component proportional to the magnitude and direction of the frequency changes in the difference frequency $f_3-f_5$; and (2) a component proportional to the phase difference between the difference frequency $f_3-f_5$ and either reference frequency $f_6$ or $f_{6a}$. Thus the action of loop C tends to maintain substantially: (a) the difference frequency $f_3-f_5$ exactly equal to that of either reference frequency $f_6$ or $f_{6a}$; and (b) a constant phase angle between the difference frequency $f_3-f_5$ and either reference frequency $f_6$ or $f_{6a}$. As previously mentioned, the error signal comprising these components activates reactance tube 67 and thereby oscillator 68 in such manner that its output frequency $f_5$ is varied to bring about frequency equalization between the difference frequency $f_3-f_5$ and either reference frequency $f_6$ or $f_{6a}$.

Thus, loop C tends to maintain the identity:

$$f_3-f_5=f_6 \text{ or } f_{6a} \qquad (4)$$

Now, combining Equations 1, 2, 3 and 4, it follows:

$$f_5-f_1=f_7-f_8=f_8 \qquad (5)$$

Thus, the combined operations of loops A, B and C serve to establish the second output tone $f_8$ shown in FIG. 1 and having any preselected frequency lying in the spectrum extending from 10 kilocycles through 300 kilocycles less 278 or 2500 cycles per second as desired. To obtain the second output tone $f_8$, a further portion of the calibrated frequency $f_1$ and a second portion of controlled frequency $f_5$ are supplied to the input of mixer 9 whose output is then caused to provide the second output tone $f_8$. As previously explained, output tone $f_8$ is thereby provided with a frequency which is less than that of output tone $f_7$ by an amount which is equal to either one of the reference frequencies $f_6$ and $f_{6a}$, as desired.

It will be recalled from the previous explanation that a shock transient is introduced into loop B when one or more of the decade tuning dials associated with reference oscillator 26 is abruptly actuated to change the reference frequency $f_4$ to a new value such, for example, as one involved in the step of actuating a decade dial from 9 to 0, and a portion of this transient is also coupled into loop C. The effect of this transient in loop C is substantially the same as that occasioned by the transient in loop B as above mentioned. The use of long smoothing time intervals in the loops A, B and C would be desirable in order to minimize noise due to phase modulation in the system of FIG. 1. With long-time constants, however, a considerable or indefinite time may elapse to effect the restoration of frequency synchronism in the respective loops B and C after the abrupt tuning change of one or more of the decade dials of oscillator 26 in the step from 9 to 0 as above mentioned. Such restoration time may be minimized by feeding a portion of the error signal of loop B via resistor 39, slider 52, resistor 55, and lead 56 in FIGS. 1 and 3 to the input of filter 66 in FIGS. 1 and 4 in a manner that will be presently explained. Thus, resistors 39 and 55 via lead 56 constitutes an impedance network 55a for establishing an electric coupling between loops B and C.

FIG. 4 is a schematic diagram of a portion of loop C in which the output of filter 66 is applied over lead 72 to activate reactance tube 67 for controlling the output frequency $f_5$ of oscillator 68 in FIG. 1 as mentioned hereinbefore. The one portion of the output frequency $f_5$ of oscillator 68 is fed over lead 73 to input of buffer amplifier 74 and thence to the input of mixer 64. To the input of this mixer is also supplied over lead 75 the further portion of output frequency $f_3$ of oscillator 31. From the output of mixer 64 the difference frequency $f_3-f_5$ is selected by filter 76 of familiar design and passed through buffer amplifier 77 to a common input point 78 of detector 65.

Either reference frequency $f_6$ or $f_{6a}$ as selected by manual switch 69 is applied via lead 79 and buffer amplifier 80a to the common detector input point 78. The composite voltage effective at the common point 78 and comprising frequencies $f_3-f_5$ and $f_6$ or $f_{6a}$ is rectified in detector 65 which is essentially the same as detector 28 except as otherwise hereinafter described. However, it will be noted in FIG. 4 that detector 65 also includes a frequency sensitive network comprising resistor 80, capacitors 81 and 82, and inductor 83 connected across the detector input. Thus, the frequency difference $f_3-f_5$ is introduced into detector 65 via the last-mentioned network having a frequency-selective characteristic such that the output voltage of the network follows the curve shown in FIG. 5. As a consequence, the output of detector 65 is a direct current having a positive slope with frequency for the condition $f_3>f_5$ and a negative slope for the condition $f_3<f_5$, except for a small negative slope 86 lying between the reference frequencies of 278 and 2500 cycles per second shown in FIG. 5. As with frequency detectors of well-known types as hereinbefore referred to, the positive slopes represent stable conditions while the negative slopes represent unstable conditions, in accordance with a corresponding slope included in the frequency-voltage characteristic of reactance tube 67. This network exerts no effect on either of the reference frequencies $f_6$ or $f_{6a}$.

In loop C, such characteristic of reactance tube 67 enables oscillator 68 to supply the particular output frequency $f_5$ for rendering the difference frequency $f_3-f_5$ equal to the reference frequency $f_6$ (278 c.p.s.) or $f_{6a}$ (2500 c.p.s.) to satisfy Equation 4. In connection with the use of switch 69 in FIG. 1 for switching the reference voltage between the frequency $f_6$ (278 c.p.s.) and $f_{6a}$ (2500 c.p.s.), a mechanical linkage 84 in FIG. 1 serves to adjust the effective capacitance of capacitor 85 in oscillator 68 to change the output frequency $f_5$ thereof by approximately 2200 cycles per second whereby the voltage required to activate reactance tube 68 is the same for the use of either one of the reference frequencies $f_6$ (278 c.p.s.) and $f_{6a}$ (2500 c.p.s.).

Further, it will be understood that detector 65 is provided with a phase characteristic for determining the phase relation between the difference frequency $f_3-f_5$ and either reference frequency $f_6$ (278 c.p.s.) or $f_{6a}$ (2500 c.p.s.), in the manner hereinbefore described in connection with the operation of phase detector 28. Thus, the detector 65 operates essentially in the manner aforedescribed for detector 28. As a consequence, the error signal transmitted from the output of detector 65 via filter 66 activates reactance tube 67 in such sense that increases in the difference frequency $f_3-f_5$ increase the output frequency $f_5$ of oscillator 68, and vice versa. Hence, the further portion of the frequency $f_1$ taken from the output of calibrated oscillator 13 and the second portion of controlled frequency $f_5$ taken from oscillator 68 are locked in the exact mutual frequency and phase relation to provide the second output tone $f_8$ mentioned above in connection with Equation 5.

Referring now to FIGS. 1 and 3 and recalling the previous description regarding resistors 39 and 55 for providing coupling between loops B and C, it will be noted that such coupling provides effectively an auxiliary control voltage for loop C. Since loop B serves to control the frequency $f_3$ of oscillator 31 in the manner hereinbefore explained, the error signal provided by detector 28 includes information regarding the changes imposed on frequency $f_3$ in response to changes in frequencies $f_2$ and/or $f_4$ and drifts in the frequency $f_1$ from its nominal setting. Hence, an introduction of a portion of the error signal developed in loop B and fed forward directly therefrom into loop C via resistor 55 and lead 56 will enable controlled frequency $f_5$ of oscillator 68 to follow substantially the changes in controlled frequency $f_3$, even without any further frequency controlling action effected otherwise in loop C. This tends to reduce the action of loop C mainly to the function of controlling the frequency $f_5$ with respect to either one of the reference frequencies $f_6$ and $f_{6a}$.

As shown in FIG. 4, the error signal of loop B may be normally fed into loop C at point 69 via lead 56 and resistor 55, the latter comprising an effective resistance of one megohm. As the effective resistance shunting resistor 39 in FIG. 3 is in excess of one megohm, actually approximately 2.2 megohms shown in broken lines and represented by numeral 62, such effective resistance exerts negligible effect on the operation of loop B in response to the error voltage developed therein. It will be understood that the 2.2 megohm resistance 62 is inherent in the design of filter 29. Moreover, any error voltage coupled backwardly from loop C into loop B is attenuated in the ratio of the order of 10:1 by the divider action of resistors 39 and 55. Hence, the error voltage developed in loop C coupled in the reverse direction into loop B has substantially no effect on the operation of the latter loop. Assuming, for example, the error voltage transmitted from loop B into loop C has a magnitude which is substantially one-half that of the error voltage effective in loop B, and assuming further the reactance tubes 30 and 67 controlling variable-frequency oscillators 31 and 68, respectively, have similar frequency-voltage characteristics, then the error voltage developed in loop B and coupled into loop C will tend to activate reactance tube 67 in the latter loop to an extent which is substantially one-half of the extent the error voltage in loop B will tend to activate reactance tube 30 in the latter loop. The effect of the error voltage coupled from loop B into loop C may be increased by introducing a voltage divider into loop B by connecting, for example, a one-megohm resistor 63 in shunt of network 67a as shown by the broken lines in the output of detector 28 in FIG. 3, and at the same time increasing the magnitude of the last-mentioned output by appropriate adjustments of slider 52. In this connection, it will be understood that resistor 65a comprises approximately 1 megohm. Thus, resistors 63 and 65a constitute a voltage divider for controlling the magnitude of the voltage coupled from loop B into loop C. This arrangement permits the introduction of variably predetermined amounts of error voltage from loop B into loop C, without changing the net gain of loop B.

It is also possible to control the relative speed of time response of oscillators 31 and 68 providing frequencies $f_3$ and $f_5$, respectively, to transients effective in the output of detector 28 in loop B by changing the connection of lead 56 to point 69a as indicated by broken line 56a in FIG. 4. This will tend to decrease the response time of oscillator 68 providing frequency $f_5$ to such transients, thereby changing the relative speeds of time response of oscillators 31 and 68. Thus, the connection of coupling resistor 55 to either of the preselected voltage terminals 69 or 69a in loop C will enable a control of the relative speeds of the time response of oscillators 31 and 68 to the transients produced in loop B to desired amounts. Further flexibility for controlling the relative response speeds of these oscillators may be obtained by substituting more complex coupling networks for the simple network including resistor 55 as shown in FIG. 3.

It will be understood that detector 65 in FIG. 4 may be modified to include frequency-selective networks similar to corresponding networks 41 and 48 in FIG. 3 to achieve action in FIG. 4 which is similar to the action represented in FIG. 2A for FIG. 3.

It is to be understood that the above-described arrangements are illustrative of the principles of the invention, and are not to be construed as limitations thereof; and that other arrangements within the spirit and scope of the invention may readily occur to those skilled in the art.

What is claimed is:

1. An automatic frequency control system for providing first and second intermediate voltages whose frequencies are differently related to given discrete frequencies in a preselected range supplied by a first oscillator of variable frequency, comprising second and third oscillators variable in frequency, one mixer utilizing a first portion of the output voltage of said first variable oscillator and a first portion of the output voltage of said second variable oscillator to produce a voltage whose frequency is the frequency difference between said two first voltage portions, one reference oscillator supplying a voltage having a preselected range of frequencies, a first frequency and phase detector utilizing said last-mentioned frequency-difference voltage and the output voltage of preselected frequency of said one reference oscillator to produce a first control voltage which activates said second variable oscillator to lock-in said last-mentioned frequency difference at the preselected frequency of said one reference oscillator and thereby to produce said first intermediate voltage which constitutes the output voltage of said second variable oscillator, another mixer utilizing said last-mentioned first intermediate voltage, which constitutes a second portion of the output voltage of said second variable oscillator, and a first portion of the output voltage of said third variable oscillator to produce a voltage whose frequency is the frequency difference between said last-mentioned two voltage portions, another reference oscillator supplying a voltage of one of two different frequencies at a given time, and a second frequency and phase detector utilizing said last-mentioned frequency-difference voltage and the output voltage of said one of the two different frequencies of said other reference oscillator to produce a second control voltage for activating said third variable oscillator to lock-in said last-mentioned frequency difference at the output frequency of said other reference oscillator and thereby to produce said second intermediate voltage which constitutes the output voltage of said third variable oscillator.

2. The system according to claim 1 which includes an impedance network to connect the output of said first detector to the output of said second detector for supplying a portion of said first control voltage to supplement said second control voltage thereby tending to lock-in the respective frequencies of said second and third variable oscillators substantially in response to said first control voltage.

3. In a system for producing two discrete signaling tones extending over a preselected frequency range and having a predetermined frequency difference therebetween comprising an oscillator calibrated in frequency over a certain operating range in which given discrete frequencies are differently related to the frequencies of said two signaling tones over said preselected frequency range, a group of oscillators variable in frequency over other preselected ranges, a plurality of automatic frequency control loops interconnected in a mutually successive relationship for connecting said calibrated oscillator and said group of oscillators in circuit to produce voltages having frequencies related to the frequencies of the voltages of said last-mentioned calibrated oscillator and group of oscillators, said calibrated oscillator being connected to a first one of said loops, means connected to said calibrated oscillator and one oscillator of said group of oscillators connected in circuit with another one of said loops and said first loop for deriving from the voltages of said last-mentioned calibrated and one oscillators the first of said two signalling tones with a frequency which is the difference between the frequencies of said last-mentioned voltages, and means connected to said calibrated oscillator and a succeeding oscillator of said group of oscillators connected in circuit with said one oscillator and a final one of said loops for deriving from the voltages of said last-mentioned calibrated and succeeding oscillators the second of said two signaling tones with a frequency which is the difference between the frequencies of said last-mentioned voltages and which differs by a predetermined amount from the frequency of said first signaling tone.

4. The system according to claim 3 in which said group of oscillators includes a first oscillator variable in frequency over a certain range, an oscillator of fixed frequency, and a generator for producing a range of harmonics of said fixed frequency, and said first loop connecting said calibrated oscillator, first oscillator and harmonic generator in circuit for producing a frequency equal to the harmonic of said fixed frequency nearest to a particular frequency selected from said calibrated oscillator.

5. The system according to claim 4 in which said group of oscillators also includes a second oscillator variable over a predetermined range of frequencies, and a third oscillator constituting said one oscillator and variable over a frequency range equivalent to said last-mentioned frequency range, and said other loop including said first, second and third oscillators in circuit for producing a frequency equal to the frequency of said second oscillator, and said first-mentioned deriving means connected to said calibrated oscillator and said third oscillator for obtaining said first signaling tone.

6. The system according to claim 5 in which said group of oscillators also includes a fourth oscillator having a fixed frequency and a fifth oscillator constituting said succeeding oscillator and variable in frequency, said final loop connecting said third, fourth and fifth oscillators in circuit for producing a frequency equal to said last-mentioned fixed frequency, said second-mentioned dervinig means connected to said calibrated oscillator and said fifth oscillator for obtaining said second signaling tone having a frequency equal to that of said first signaling tone minus the fixed frequency of said fourth oscillator.

7. The system according to claim 6 in which said fourth oscillator has a plurality of different fixed frequencies, said fifth oscillator variable in frequency by a given amount upon the selection of any one of said last-mentioned plurality of frequencies whereby said final loop will produce a frequency difference equal to any one of said last-mentioned plurality of frequencies, said second-mentioned deriving means connected to said calibrated oscillator and fifth oscillator for obtaining said second signaling tone having a frequency equal to that of said first signaling tone minus any one of the plurality of different frequencies of said fourth oscillator.

8. The system according to claim 3 which includes two additional oscillators having fixed different frequencies, a detector connected to a next-preceding one of said two loops, a network comprising resistive and reactive impedances connected across the input of said detector for rendering said detector responsive to both of said two fixed frequencies, said succeeding oscillator connected to the output of said detector and including a capacitor for varying the frequency thereof, a switch connecting said two different oscillators through said network to said final loop one at a time, and a mechanical linkage connecting said switch and capacitor for controlling the frequency of said succeeding oscillator to compensate for the particular one of said two different oscillators connected to said final loop at a given time.

9. The system according to claim 3 which includes a further oscillator connected to said other loop and variable in frequency in terms of decades of different predetermined amounts of cycles per second for effecting frequency changes from the highest value to the lowest value of a preselected one of said decades whereby a transient tends to be introduced into said other loop to impair the synchronism of the frequencies of said oscillators connected to said last-mentioned loop, and a voltage transmitting network connecting said other loop to said final loop for supplying voltages from said other loop into said final loop thereby tending to maintain synchronism of the frequencies of said oscillators connected to said other loop regardless of the frequency changes effected in further oscillator by said decades.

10. The system according to claim 3 which includes an impedance network for coupling said other loop to said final loop to supply a portion of a voltage produced in said other loop to said final loop for simultaneously controlling the frequencies of said one and succeeding oscillators connected in said other and final loops, respectively, in response to the voltage produced in said other loop.

11. The system according to claim 10 in which said impedance coupling network comprises substantially resistance.

12. The system according to claim 10 in which a voltage divider is connected in said other loop for variably controlling the amount of voltage coupled from said other loop into said final loop without changing the net gain of said other loop.

13. The system according to claim 10 in which said coupling network is connected to one of two different voltage terminals at a given time in said final loop for controlling the relative speeds of time response of said one and succeeding oscillators connected in said other and final loops, respectively.

14. An automatic frequency control system for providing a signaling voltage whose frequency is precisely related to given discrete frequencies in a preselected range supplied by a calibrated oscillator, comprising first and second oscillators variable in frequency, a first mixer utilizing a first portion of the output voltage of said calibrated oscillator and a first portion of the output voltage of said first variable oscillator to produce a voltage whose frequency is the frequency difference between said first voltage portions, a first reference oscillator supplying a preselected fixed frequency, a generator for producing harmonics of said first reference frequency, a phase detector utilizing the phase difference between the voltages of said frequency-difference and generator to produce a first control voltage for activating said first variable oscillator to lock-in said frequency difference equal to the nearest harmonic voltage of said first reference frequency in relation to a selected given frequency of said calibrated oscillator, a second mixer utilizing a second portion of the output voltage of said first variable oscillator and first portion of the output voltage of said second variable oscillator to produce a voltage whose frequency is the frequency difference between said last-mentioned second and first voltage portions, a second reference oscillator supplying a preselected range of frequencies, a frequency and phase detector utilizing said last-mentioned frequency-difference voltage and the output voltage of preselected frequency of said second reference oscillator to produce a second control voltage which activates said second variable oscillator to lock-in said last-mentioned frequency difference at the preselected frequency of said second reference oscillator, and a third mixer utilizing second portions of the output voltages of said second variable and calibrated oscillators to produce said signaling voltage whose frequency is the frequency difference between said last-mentioned second voltage portions.

15. An automatic frequency control system for providing first and second signaling voltages whose frequencies are differently related to given discrete frequencies in a preselected range supplied by a calibrated oscillator, comprising first, second and third oscillators variable in frequency, a first mixer utilizing a first portion of the output voltage of said calibrated oscillator and a first portion of the output voltage of said first variable oscillator to produce a voltage whose frequency is the frequency difference between said first voltage portions, a first reference oscillator supplying a preselected fixed frequency, a generator for producing harmonics of said first reference frequency, a first detector utilizing the voltages of said frequency-difference and generator to produce a first control voltage for activating said first variable oscillator to lock-in said frequency difference equal to the nearest harmonic voltage of said first reference frequency in relation to a selected given frequency of said calibrated oscillator, a second mixer utilizing a second portion of the output voltage of said first variable oscillator and first portion of the output voltage of said second variable oscillator to produce a voltage whose frequency is the frequency difference between said last-mentioned second and first voltage portions, a second reference oscillator supplying a preselected range of frequencies, a first frequency and phase detector utilizing said last-mentioned frequency-difference voltage and the output voltage of preselected frequency of said second reference oscillator to produce a second control voltage of which a first portion activates said second variable oscillator to lock-in said last-mentioned frequency difference at the preselected frequency of said second reference oscillator, a third mixer utilizing second portions of the output voltages of said second variable and calibrated oscillators to produce said first signaling voltage whose frequency is the frequency difference between said last-mentioned second voltage portions, a fourth mixer utilizing a third portion of the output voltage of said second variable oscillator and a first portion of the output voltage of said third variable oscillator to produce an output voltage whose frequency is the frequency difference between said last-mentioned voltage portions, a third reference oscillator supplying one of two different frequencies at a given time, a second frequency and phase detector utilizing said last-mentioned frequency-difference voltage and the output voltage of said third reference oscillator to produce a third control voltage for activating said third variable oscillator to lock-in said last-mentioned frequency difference at the frequency of said third reference oscillator, and a fifth mixer utilizing a third portion of the output voltage of said calibrated oscillator and a second portion of the output voltage of said third variable oscillator to produce said second signaling voltage whose frequency is the frequency difference between said last-mentioned second and third voltage portions.

16. The system according to claim 15 which includes a network to connect the output of said first frequency and phase detector to the output of said second frequency and phase detector for supplying a second portion of said second control voltage to supplement said third control voltage thereby tending to lock-in the frequencies of said second and third variable oscillators in response to said second control voltage.

17. The system according to claim 16 which includes a further network comprising resistive and reactance impedances connected to the input of said second frequency and phase detector for rendering said last-mentioned detector responsive to either of the two different frequencies supplied thereto by said third reference oscillator.

18. The system according to claim 17 which includes a frequency-sensitive network interposed in circuit between the output of said second mixer and the input of said first frequency and phase detector to vary in a predetermined manner the magnitude of the frequency-difference voltage present in the output of said second mixer and supplied to the input of said last-mentioned detector.

19. The system according to claim 18 which includes a frequency-sensitive network interposed in circuit between the output of said second reference oscillator and the input of said first frequency and phase detector to vary the magnitude of the second reference voltage as a function of the frequency of the last-mentioned voltage.

20. The system according to claim 19 in which each of said first and second frequency and phase detectors comprises a common input terminal, two solid rectifiers each including a cathode and an anode, said cathode of one rectifier and anode of the second rectifier connected to said common terminal, a first resistor connected between said anode of one rectifier and said cathode of said second rectifier, a movable connection on said first resistor to provide an output, a source of direct current having a positive terminal and a negative terminal connected to a fixed potential point, a second resistor interposed between said last-mentioned positive and negative terminals, and a movable connection on said second resistor joined to a point common to said cathode of said second rectifier and first resistor for varyingly biasing said two rectifiers in an opposite sense.

21. The system according to claim 20 which includes a network comprising resistive and reactive impedances connected across the input of one of said last-mentioned detectors between said common input terminal and said fixed potential point.

22. The system according to claim 21 in which said last-mentioned network includes a third resistor and a first capacitor connected in series between said common input terminal and said fixed potential point, an inductor having one terminal connected to a point common to said last-mentioned serially connected resistor and capacitor, and a second capacitor connected between another terminal of said inductor and said fixed potential point, said last-mentioned network tending to render said one detector responsive to the two different frequencies of said third reference oscillator.

References Cited in the file of this patent

UNITED STATES PATENTS

| | | |
|---|---|---|
| 2,808,509 | Felch et al. | Oct. 1, 1957 |
| 2,888,562 | Robinson | May 26, 1959 |